United States Patent
Horng et al.

(10) Patent No.: US 6,538,357 B2
(45) Date of Patent: Mar. 25, 2003

(54) DIRECT CURRENT BRUSHLESS MOTOR OF RADIAL AIR-GAP

(75) Inventors: Alex Horng, Kaohsiung (TW); Yin tso-kuo, Kaohsiung Hsien (TW); Ching-shen Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/829,975

(22) Filed: Apr. 11, 2001

(65) Prior Publication Data

US 2002/0149286 A1 Oct. 17, 2002

(51) Int. Cl.7 .................................................. H02K 3/00
(52) U.S. Cl. ....................................... 310/257; 310/216
(58) Field of Search ............................. 310/67 R, 49 R, 310/42, 216–218, 254–259, 91; 29/596–598; 360/99.04, 99.08, 98.07

(56) References Cited

U.S. PATENT DOCUMENTS

| | | | | |
|---|---|---|---|---|
| 3,508,091 A | * | 4/1970 | Kavanaugh | 310/49 R |
| 4,775,813 A | * | 10/1988 | Janson | 310/257 |
| 4,823,038 A | * | 4/1989 | Mizutani et al. | 310/257 |
| 5,808,390 A | * | 9/1998 | Miyazawa et al. | 310/194 |
| 5,859,487 A | * | 1/1999 | Chen | 310/254 |
| 5,945,765 A | * | 8/1999 | Chen | 310/257 |
| 6,285,108 B1 | * | 9/2001 | Horng | 310/259 |

* cited by examiner

Primary Examiner—Tran Nguyen
(74) Attorney, Agent, or Firm—Bacon & Thomas, PLLC (57) ABSTRACT

A direct current brushless motor of a radial air-gap includes a rotor having a rotation shaft rotated in a magnetic conducting tube of the stator. The magnetic conducting tube has an outer wall combined with a coil seat. The coil seat has two ends respectively mounted with an upper pole plate and a lower pole plate. Each of the upper pole plate and the lower pole plate has a periphery having upper pole faces and/or lower pole faces respectively extended upward and downward therefrom. The pole faces of the upper pole plate and the lower pole plate are arranged in a staggered manner. The pole faces encompassing the coil seat are formed with larger openings for allowing pull out of a distal end of a coating wire of the coil seat.

19 Claims, 11 Drawing Sheets

DIRECT CURRENT BRUSHLESS MOTOR OF RADIAL AIR-GAP

BACKGROUND OF THE INVENTION

1. Field of the Invention

The present invention relates to a direct current brushless motor of a radial air-gap, having a larger sensing area, and the coating wire of the stator coil is easily drawn outward for installation.

2. Description of the Related Art

Figure 1:
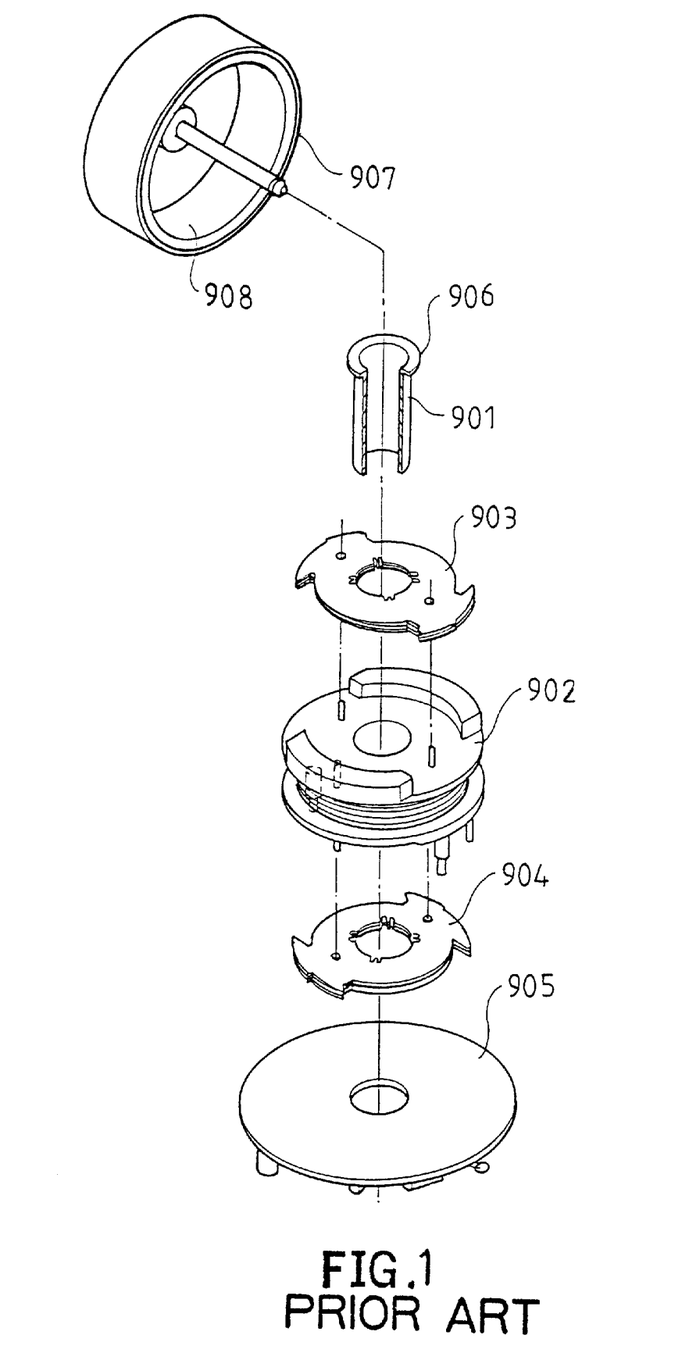
FIG. 1 is an exploded perspective view of a first conventional direct current brushless motor in accordance with the prior art.

A first conventional direct current brushless motor in accordance with the prior art shown in FIG. 1 comprises a metallic shaft tube 901 having an outer wall combined with a coil 902, upper and lower pole plates 903, 904, and a circuit board 905. The metallic shaft tube 901 includes a flange 906 at one end thereof. By such an arrangement, the upper and lower pole plates 903, 904 are formed by laminated silicon plates for increasing the magnetic sensing area between the upper and lower pole plates 903, 904 and the permanent magnet 908 of the rotor 907. Thus, increase of the number of the pole plates will increase the working process of fabrication, the material, and the cost of the product.

Figure 2:
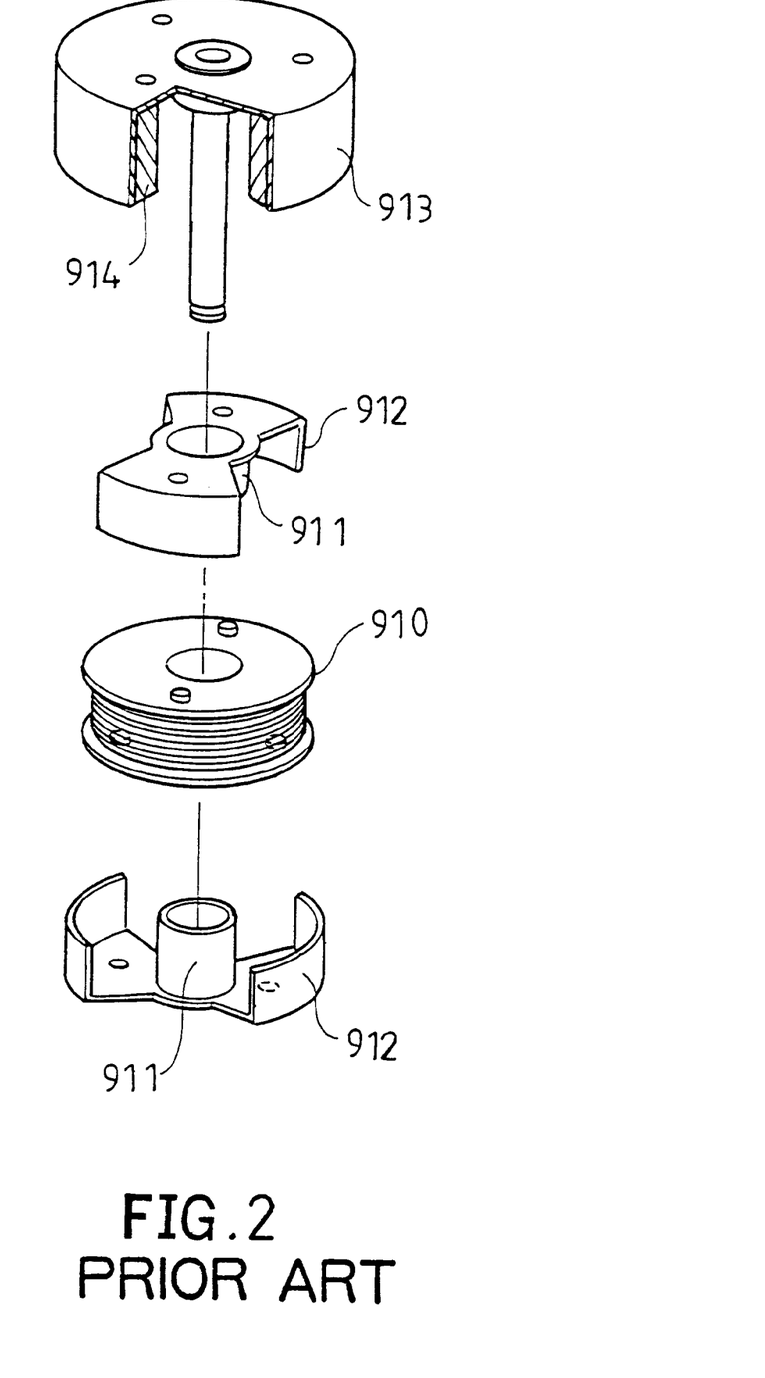
FIG. 2 is an exploded perspective view of a second conventional direct current brushless motor in accordance with the prior art.

A second conventional direct current brushless motor in accordance with the prior art shown in FIG. 2 is disclosed in U.S. Pat. No. 4,891,567, wherein the upper and lower pole plates 911 are combined on the stator seat 910. Each of the upper and lower pole plates 911 has vertically bent pole faces 912 which are induced with the permanent magnet 914 of the rotor 913. The two pole faces 912 of the upper and lower pole plates 911 are extended toward each other, so that two pole faces 912 of the upper and lower pole plates 911 encompass the outer periphery of the stator seat 910. The pole faces 912 of the upper and lower pole plates 911 have a larger sensing area. However, when the distal end of the coating wire of the coil is drawn outward from the pole faces 912 of the upper and lower pole plates 911, the insulation layer of the coating wire are easily scraped and broken by the coarse edges of the pole faces 912, so that the coil winding is easily broken after it is impacted by the starting current during long-term utilization, thereby affecting operation of the motor, and thereby reducing the lifetime of the motor. In addition, if the width of the pole face 912 of the upper and lower pole plates 911 is decreased to facilitate pulling out of the distal end of the coating wire of the coil, the sensing area between the pole face 912 and the rotor is reduced, thereby decreasing the quality of the motor during fabrication.

Figure 3:
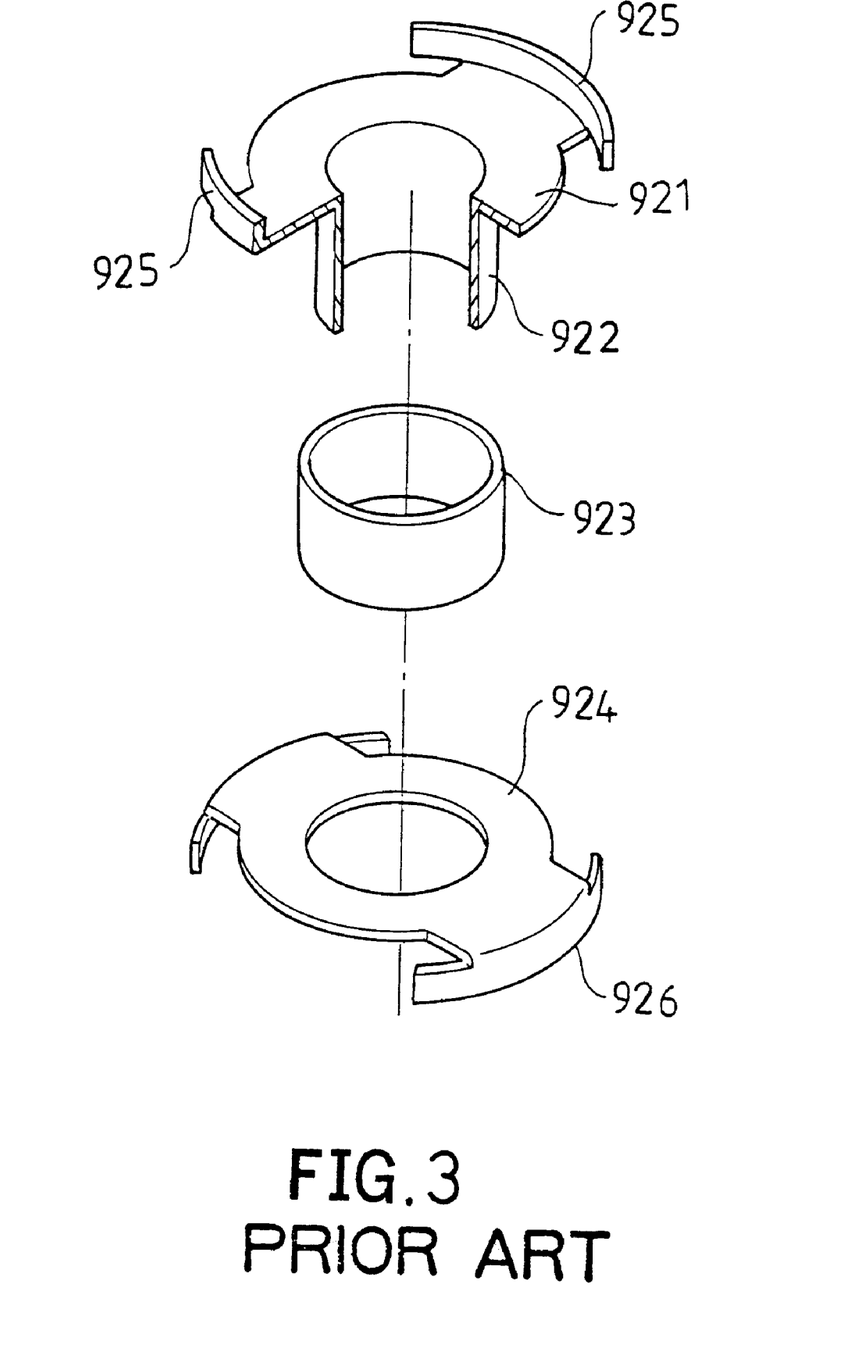
FIG. 3 is an exploded perspective view of a third conventional direct current brushless motor in accordance with the prior art.

A third conventional direct current brushless motor in accordance with the prior art shown in FIG. 3 is disclosed in the Applicant's U.S. patent application Ser. No. 09/389,018, wherein the first pole plate 921 is provided with a magnet conducting tube 922 for combination of the second pole plate 924. The outer wall of the magnet conducting tube 922 is fitted with an insulating bushing 923 which may be wound with a coil. The first pole plate 921 and the second pole plate 924 are respectively provided with pole faces 925, 926 each extended toward an opposite direction. Thus, the direct current brushless motor and the stator have pole faces with a larger sensing area, and the coil is directly wound around the insulating bushing 923, so that the coating wire is not easily scraped, thereby preventing the insulation layer from being broken.

SUMMARY OF THE INVENTION

The primary objective of the present invention is to provide a direct current brushless motor of a radial air-gap, wherein the pole plate of the stator has pole faces with a larger sensing area to induce with the permanent magnet of the rotor, thereby increasing the output torque of the motor.

Another objective of the present invention is to provide a direct current brushless motor of a radial air-gap, wherein the pole faces around the coil seat are formed with larger openings for facilitating pulling out of a distal end of a coating wire of the coil seat, thereby preventing the coating wire from being scraped, and thereby preventing the insulation layer from being broken, and the stator has pole faces with a larger sensing area.

A further objective of the present invention is to provide a direct current brushless motor of a radial air-gap, which is easily machined, thereby decreasing the cost of production.

In accordance with the present invention, there is provided a direct current brushless motor of a radial air-gap includes a rotor having a rotation shaft rotated in a magnetic conducting tube of the stator. The magnetic conducting tube has an outer wall combined with a coil seat. The coil seat has two ends respectively mounted with an upper pole plate and a lower pole plate. Each of the upper pole plate and the lower pole plate has a periphery having upper pole faces and/or lower pole faces respectively extended upward and downward therefrom. Each pole face is induced with the permanent magnet of the rotor. The pole faces of the upper pole plate and the lower pole plate are arranged in a staggered manner. The pole faces encompassing the coil seat are formed with larger openings for allowing pull out of a distal end of a coating wire of the coil seat.

Further benefits and advantages of the present invention will become apparent after a careful reading of the detailed description with appropriate reference to the accompanying drawings.

DETAILED DESCRIPTION OF THE PREFERRED EMBODIMENTS

Figure 4:
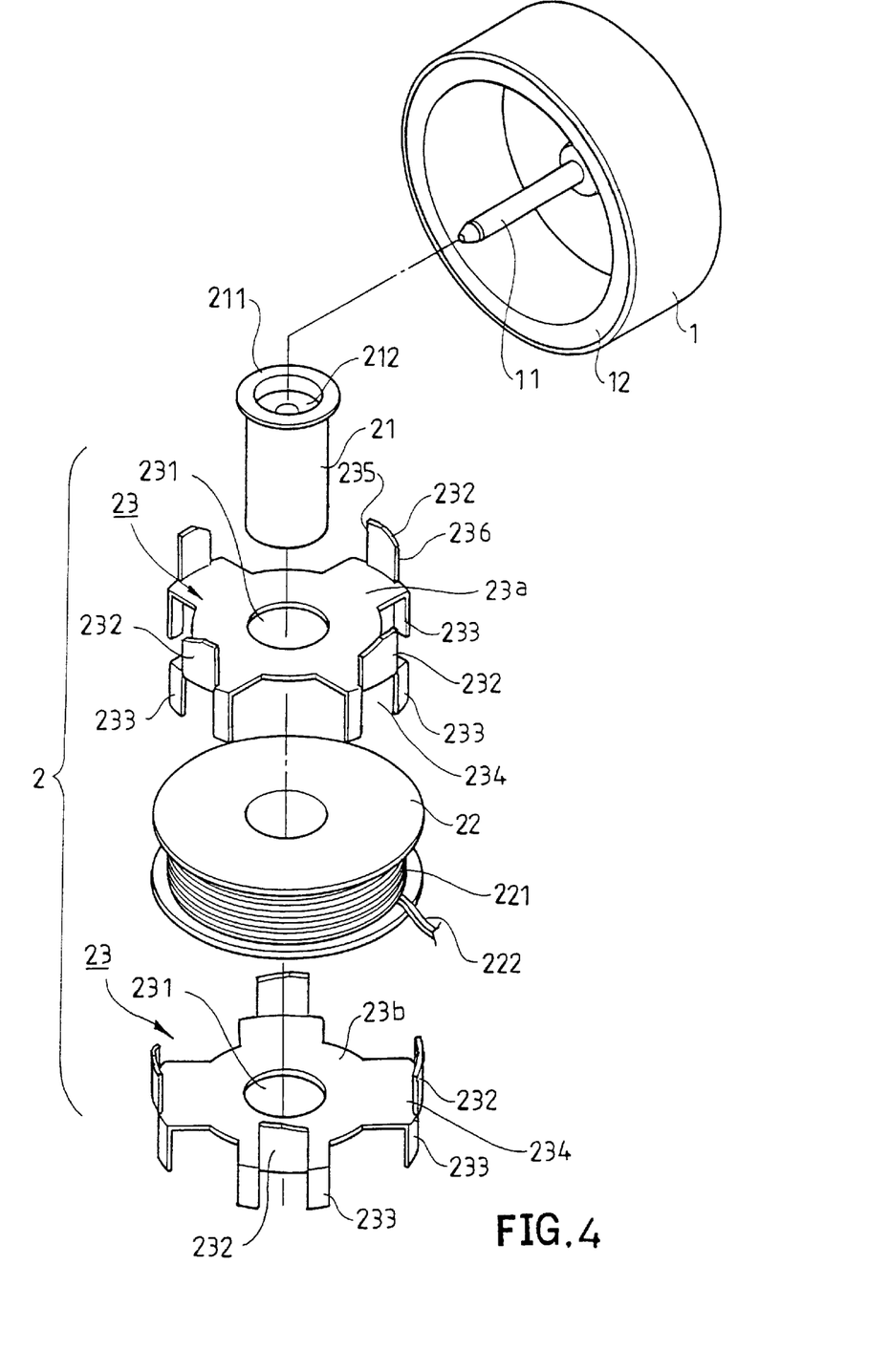
FIG. 4 is an exploded perspective view of a direct current brushless motor of a radial air-gap in accordance with a first embodiment of the present invention.

Referring to the drawings and initially to FIG. 4, a direct current brushless motor of a radial air-gap in accordance with a first embodiment of the present invention comprises a rotor 1, and a stator 2.

The rotor 1 may be a conventional structure, and includes a rotation shaft 11 that can be rotated in the magnetic conducting tube 21 of the stator 2. The rotor 1 has an annular permanent magnet 12.

Figure 5:
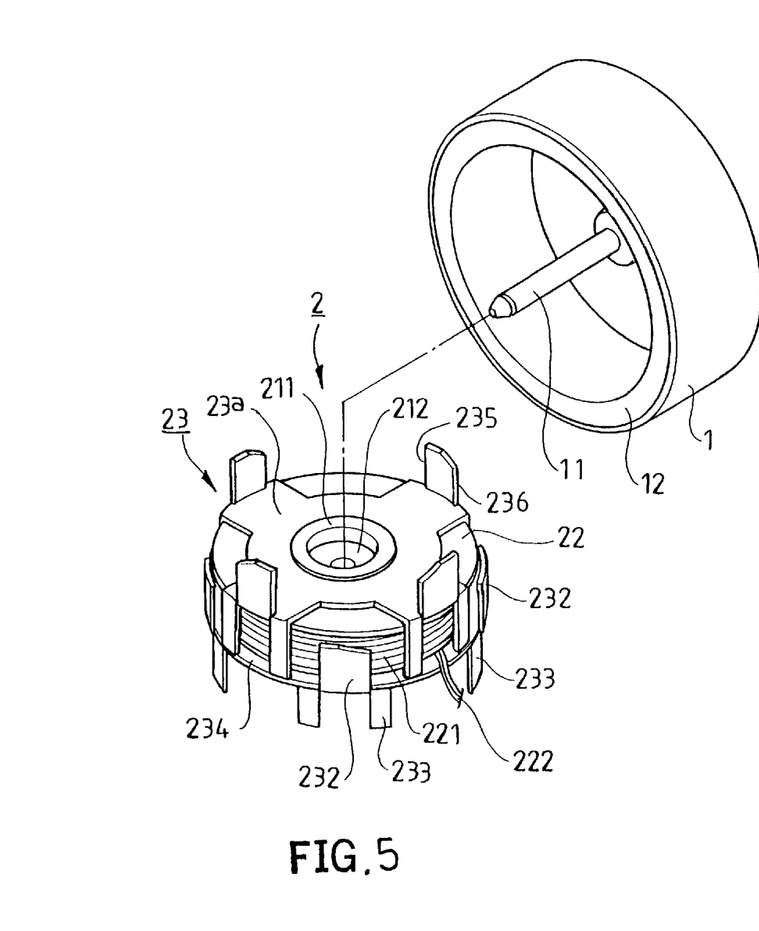
FIG. 5 is a partially perspective assembly view of a direct current brushless motor of a radial air-gap in accordance with the first embodiment of the present invention.

The stator 2 includes a magnetic conducting tube 21 passed through a coil seat 22. Each of the two ends of the coil seat 22 is provided with a pole plate 23. The magnetic conducting tube 21 has one end formed with a flange 211 for retaining the combination of the seat coil 22 and the pole plates 23 without detachment. A bearing 212 is mounted in the magnetic conducting tube 21 for supporting rotation of the rotation shaft 11 of the rotor 1. A coating wire 221 is wound around the coil seat 22, and has a distal end 222 connected to the power supply. The pole plates 23 are respectively placed at the two ends of the coil seat 22. As shown in the figure, the pole plate 23 located above the coil seat 22 is called the upper pole plate 23a, and the pole plate 23 located under the coil seat 22 is called the lower pole plate 23b. The pole plate 23 defines a central hole 231 for passage of the magnetic conducting tube 21. The periphery of the pole plate 23 is provided with pole faces including upper pole faces 232 and lower pole faces 233. Thus, the pole plate 23 has larger pole faces to induce with the permanent magnet 12 of the rotor 1. The pole faces of the upper pole plate 23a and the lower pole plate 23b are distributed in an equal angled manner about the center of the pole plate 23. The pole faces of the upper pole plate 23a and the lower pole plate 23b are arranged in an staggered annular manner around the periphery of the coil seat 22. The lower pole faces 233 of the upper pole plate 23a or the upper pole faces 232 of the lower pole plate 23b are formed with openings 234 for allowing pull out of the distal end 222 of the coating wire 221 of the coil seat 22 (see FIG. 5). The length of the first side 235 of the pole face of the pole plate 23 may be greater than that of the second side 236, or the thickness or height of the pole face of the first side 235 may be greater than that of the second side 236, so that the pole plate 23 may produce an uneven magnetic force, thereby providing an instantaneously power to the permanent magnet 12 of the rotor 1, so that the rotor 1 is easily started.

Figure 6:
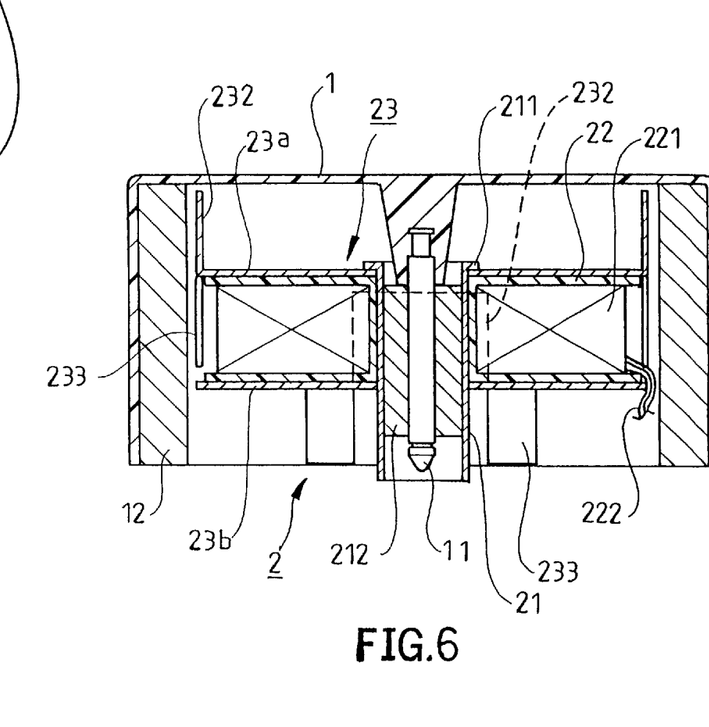
FIG. 6 is a front plan cross-sectional assembly view of the direct current brushless motor of a radial air-gap as shown in FIG. 4.

Referring to FIG. 6, the magnetic conducting tube 21 is extended through the coil seat 22, the upper pole plate 23a, and the lower pole plate 23b. The lower pole faces 233 of the upper pole plate 23a and the upper pole faces 232 of the lower pole plate 23b are arranged in an staggered annular manner around the periphery of the coil seat 22. Thus, the stator 2 has pole faces of a larger sensing area to induce with the permanent magnet 12 of the rotor 1. The lower pole faces 233 of the upper pole plate 23a and the upper pole faces 232 of the lower pole plate 23b encompassing the periphery of the coil seat 22 will have a larger opening 234, thereby facilitating pulling out the distal end 222 of the coating wire 221, so that the pull out work of the coating wire 221 is convenient to prevent the insulating layer thereof from being scraped.

Figure 7:
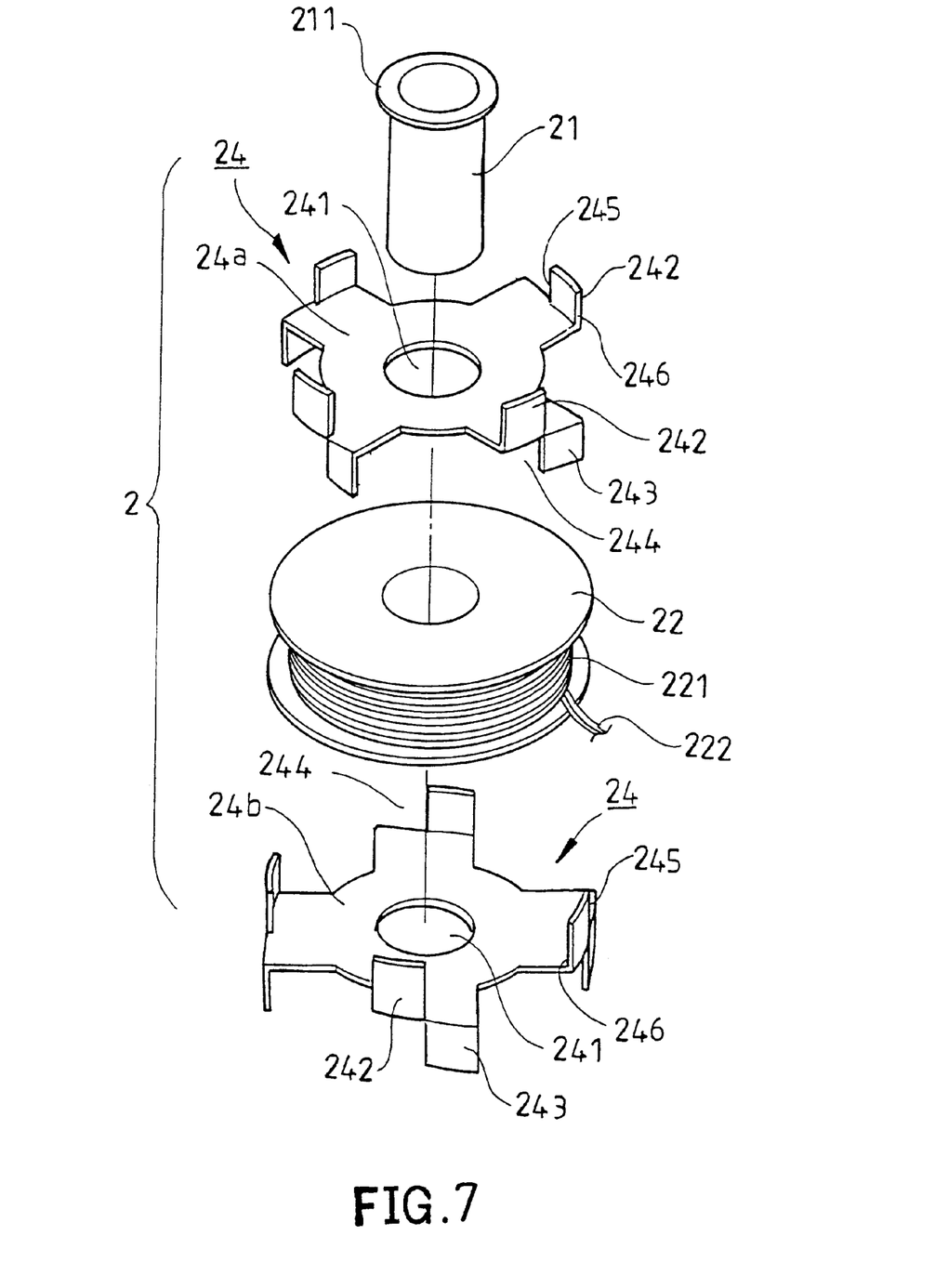
FIG. 7 is an exploded perspective view of a stator of a direct current brushless motor of a radial air-gap in accordance with another embodiment of the present invention.

Referring to FIG. 7, the stator 2 of another embodiment of the present invention is disclosed. The stator 2 includes a magnetic conducting tube 21 passed through a coil seat 22. Each of the two ends of the coil seat 22 is provided with a pole plate 24. The pole plate 24 located above the coil seat 22 is called the upper pole plate 24a, and the pole plate 24 located under the coil seat 22 is called the lower pole plate 24b. The pole plate 24 defines a central hole 241 for passage of the magnetic conducting tube 21. The periphery of the pole plate 24 is provided with pole faces including upper pole faces 242 and lower pole faces 243. Thus, the pole plate 24 has pole faces with a larger sensing area to induce with the permanent magnet 12 of the rotor 1. The pole faces of the upper pole plate 24a and the lower pole plate 24b are distributed in an equal angled manner about the center of the pole plate 24. The upper pole face 242 and the lower pole face 243 are arranged in a staggered manner. Thus, the lower pole faces 243 of the upper pole plate 24a or the upper pole faces 242 of the lower pole plate 24b are arranged in an staggered annular manner around the periphery of the coil seat 22. A larger opening 244 is formed between the lower pole face 243 of the upper pole plate 24a and the upper pole face 242 of the lower pole plate 24b for allowing pull out of the distal end 222 of the coating wire 221 of the coil seat 22. Thus, the stator 2 has pole faces of a larger sensing area to induce with the permanent magnet 12 of the rotor 1. The lower pole faces 243 of the upper pole plate 24a and the upper pole faces 242 of the lower pole plate 24b encompassing the periphery of the coil seat 22 will have a larger opening 244, thereby facilitating pulling out the distal end 222 of the coating wire 221, so that the pull out work of the coating wire 221 is convenient to prevent the insulating layer thereof from being scraped. The length of the first side 245 of the pole face of the pole plate 24 may be greater than that of the second side 246, or the thickness or height of the pole face of the first side 245 may be greater than that of the second side 246, so that the pole plate 24 may produce an uneven magnetic force, thereby providing an instantaneously power to the permanent magnet 12 of the rotor 1, so that the rotor 1 is easily started.

Figure 8:
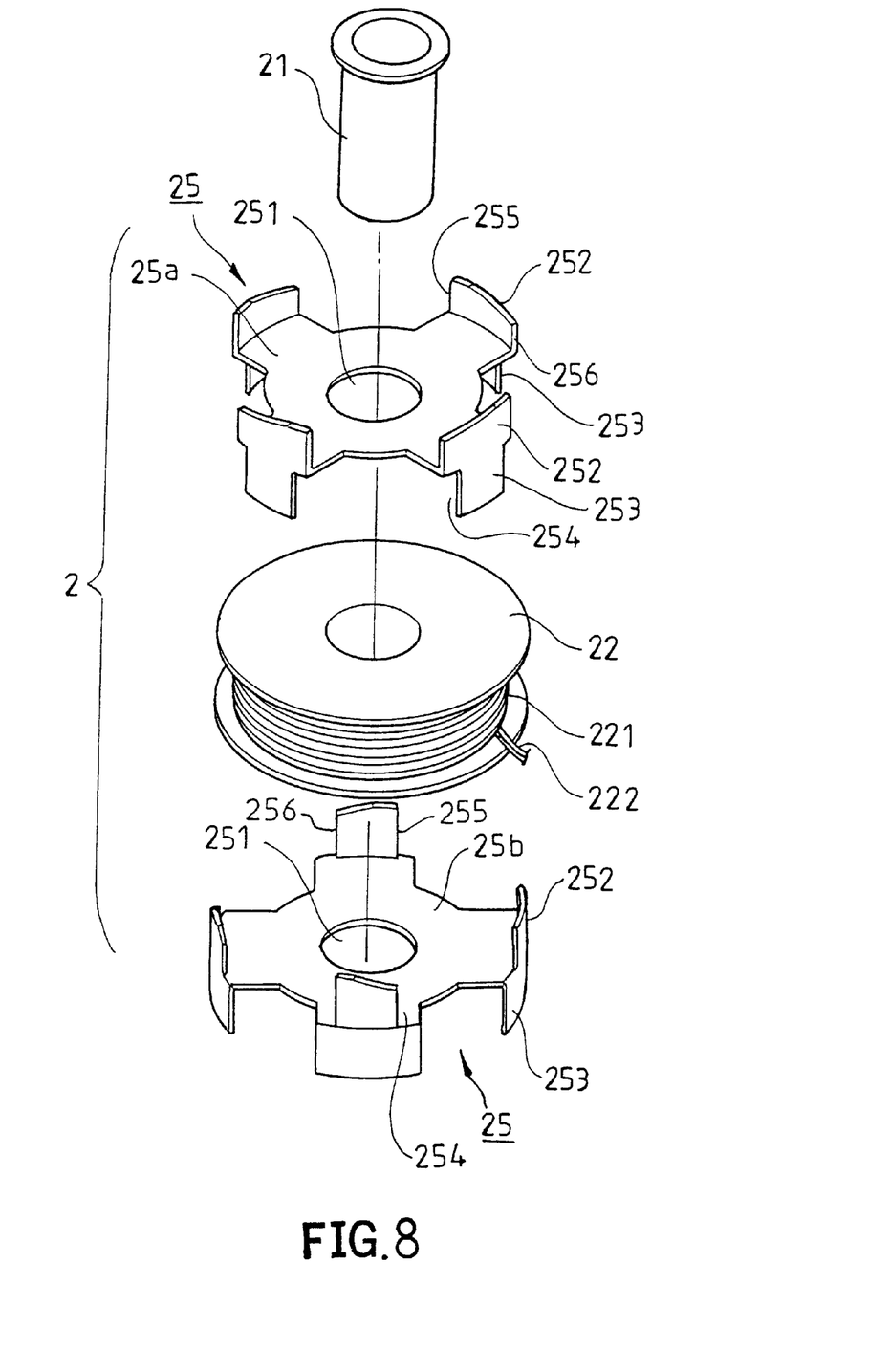
FIG. 8 is an exploded perspective view of a stator of a direct current brushless motor of a radial air-gap in accordance with a further embodiment of the present invention.

Referring to FIG. 8, the stator 2 of a further embodiment of the present invention is disclosed. The stator 2 includes a magnetic conducting tube 21 passed through a coil seat 22. Each of the two ends of the coil seat 22 is provided with a pole plate 25. The pole plate 25 located above the coil seat 22 is called the upper pole plate 25a, and the pole plate 25 located under the coil seat 22 is called the lower pole plate 25b. The pole plate 25 defines a central hole 251 for passage of the magnetic conducting tube 21. The periphery of the pole plate 25 is provided with pole faces including upper pole faces 252 and lower pole faces 253. Thus, the pole plate 25 has pole faces with a larger sensing area to induce with the permanent magnet 12 of the rotor 1. The pole faces of the upper pole plate 25a and the lower pole plate 25b are distributed in an equal angled manner about the center of the pole plate 25. The upper pole face 252 and the lower pole face 253 have different widths, wherein the width of the upper pole face 252 is greater than that of the lower pole face 253. Thus, the lower pole faces 253 of the upper pole plate 25a and the upper pole faces 252 of the lower pole plate 25b are arranged in an staggered annular manner around the periphery of the coil seat 22. An opening 254 is formed by the difference of width between the lower pole face 253 and the upper pole face 252 for allowing pull out of the distal end 222 of the coating wire 221 of the coil seat 22. Thus, the stator 2 has pole faces of a larger sensing area to induce with the permanent magnet 12 of the rotor 1. The lower pole faces 253 of the upper pole plate 25a and the upper pole faces 252 of the lower pole plate 25b encompassing the periphery of the coil seat 22 will have a larger opening 254, thereby facilitating pulling out the distal end 222 of the coating wire 221, so that the pull out work of the coating wire 221 is convenient to prevent the insulating layer thereof from being scraped. The length of the first side 255 of the pole face of the pole plate 25 may be greater than that of the second side 256, or the thickness or height of the pole face of the first side 255 may be greater than that of the second side 256, so that the pole plate 25 may produce an uneven magnetic force, thereby providing an instantaneously power to the permanent magnet 12 of the rotor 1, so that the rotor 1 is easily started.

Figure 9:
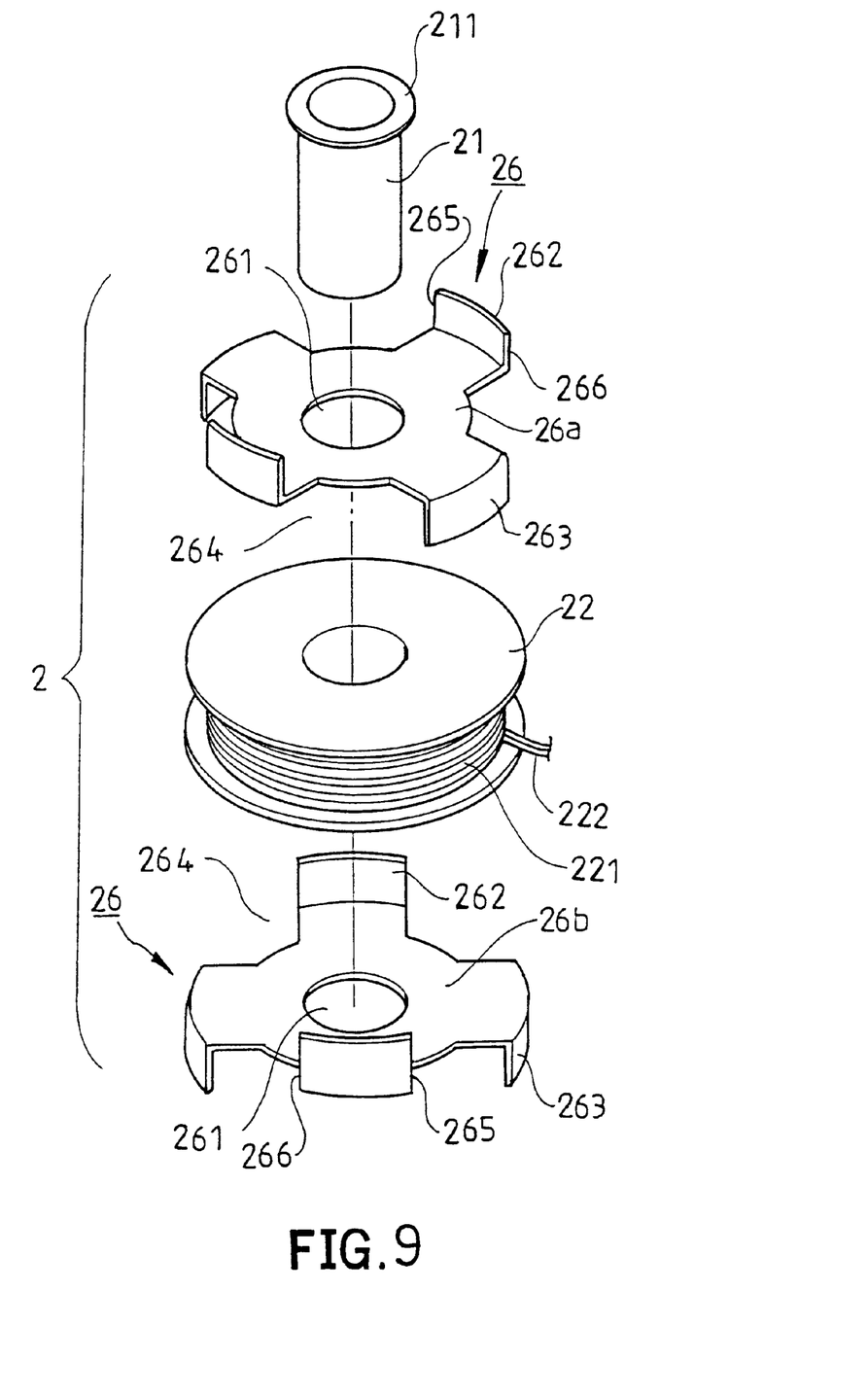
FIG. 9 is an exploded perspective view of a stator of a direct current brushless motor of a radial air-gap in accordance with a further embodiment of the present invention.

Referring to FIG. 9, the stator 2 of a further embodiment of the present invention is disclosed. The stator 2 includes a magnetic conducting tube 21 passed through a coil seat 22. Each of the two ends of the coil seat 22 is provided with a pole plate 26. The pole plate 26 located above the coil seat 22 is called the upper pole plate 26a, and the pole plate 26 located under the coil seat 22 is called the lower pole plate 26b. The pole plate 26 defines a central hole 261 for passage of the magnetic conducting tube 21. The periphery of the pole plate 26 is provided with pole faces including upper pole faces 262 and lower pole faces 263. Thus, the pole plate 26 has pole faces with a larger sensing area to induce with the permanent magnet 12 of the rotor 1. The pole faces of the upper pole plate 26a and the lower pole plate 26b are distributed in an equal angled manner about the center of the pole plate 26. The upper pole face 262 and the lower pole face 263 are respectively mounted on the upper end and the lower end and are arranged in a staggered manner. Thus, the lower pole faces 263 of the upper pole plate 26a and the upper pole faces 262 of the lower pole plate 26b are arranged in an staggered annular manner around the periphery of the coil seat 22. An opening 264 is formed between the lower pole face 263 and the upper pole face 262 for allowing pull out of the distal end 222 of the coating wire 221 of the coil seat 22. Thus, the stator 2 has pole faces of a larger sensing area to induce with the permanent magnet 12 of the rotor 1. The lower pole faces 263 of the upper pole plate 26a and the upper pole faces 262 of the lower pole plate 26b encompassing the periphery of the coil seat 22 will have a larger opening 264, thereby facilitating pulling out the distal end 222 of the coating wire 221, so that the pull out work of the coating wire 221 is convenient to prevent the insulating layer thereof from being scraped. The length of the first side 265 of the pole face of the pole plate 26 may be greater than that of the second side 266, or the thickness or height of the pole face of the first side 265 may be greater than that of the second side 266, so that the pole plate 26 may produce an uneven magnetic force, thereby providing an instantaneously power to the permanent magnet 12 of the rotor 1, so that the rotor 1 is easily started.

Figure 10:
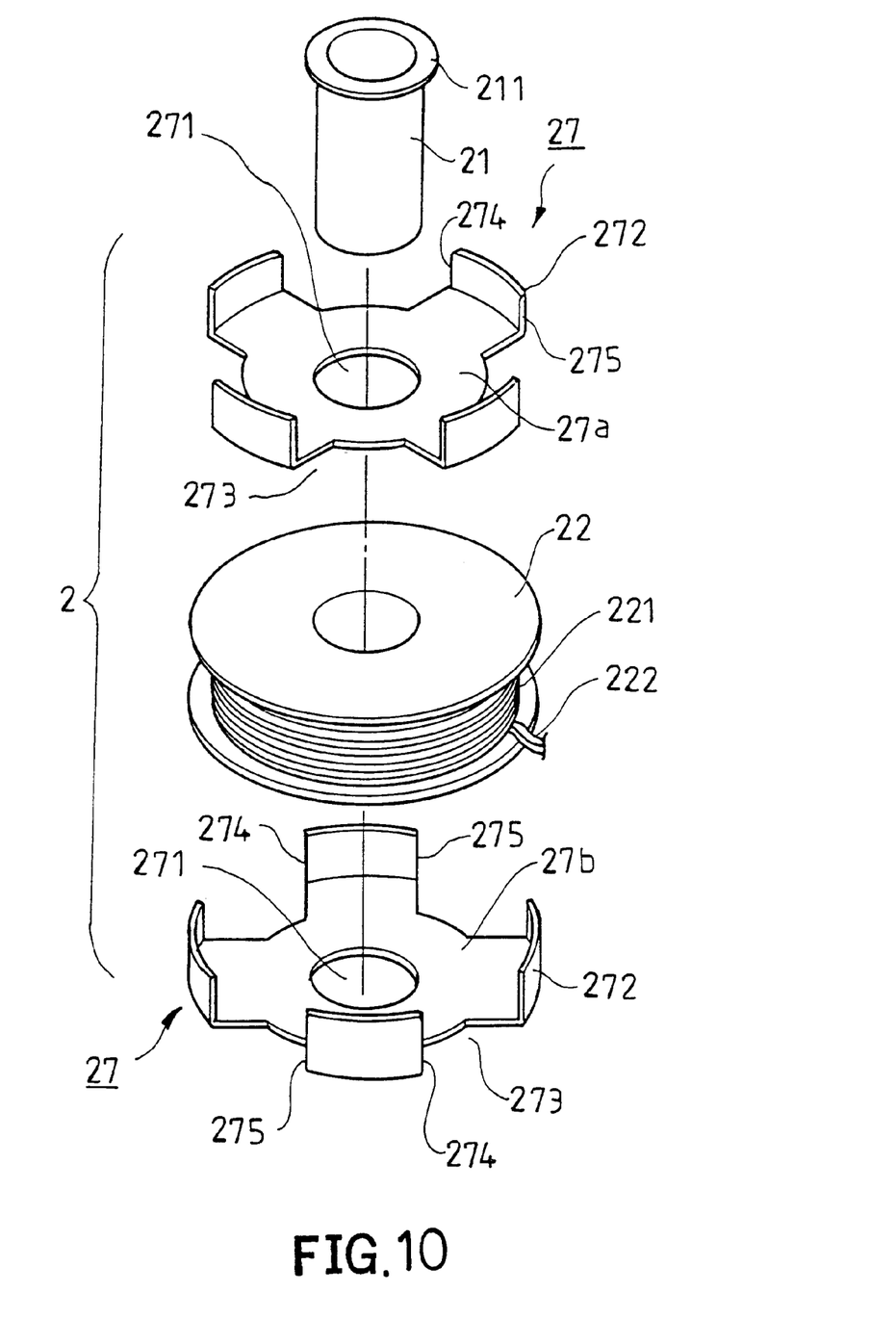
FIG. 10 is an exploded perspective view of a stator of a direct current brushless motor of a radial air-gap in accordance with a further embodiment of the present invention.

Referring to FIG. 10, the stator 2 of a further embodiment of the present invention is disclosed. The stator 2 includes a magnetic conducting tube 21 passed through a coil seat 22. Each of the two ends of the coil seat 22 is provided with a pole plate 27. The pole plate 27 located above the coil seat 22 is called the upper pole plate 27a, and the pole plate 27 located under the coil seat 22 is called the lower pole plate 27b. The pole plate 27 defines a central hole 271 for passage of the magnetic conducting tube 21. The periphery of the pole plate 27 is provided with pole faces 272. The pole faces 272 of the upper pole plate 27a and the lower pole plate 27b are extended toward the same direction. As shown in the figure, the pole faces 272 of the upper pole plate 27a and the lower pole plate 27b are extended upward at the same time. Thus, the pole plate 27 has pole faces 272 with a larger sensing area to induce with the permanent magnet 12 of the rotor 1. The pole faces 272 of the upper pole plate 27a and the lower pole plate 27b are distributed in an equal angled manner about the center of the pole plate 27. The pole faces 272 of the upper pole plate 27a and the pole faces 272 of the lower pole plate 27b are arranged in a staggered manner. The pole faces 272 of the lower pole plate 27b are arranged in an annular manner around the periphery of the coil seat 22. Thus, a larger opening 273 is formed between the pole face 272 of the lower pole plate 27b for allowing pull out of the distal end 222 of the coating wire 221 of the coil seat 22. Thus, the stator 2 has pole faces of a larger sensing area to induce with the permanent magnet 12 of the rotor 1. The pole faces 272 of the lower pole plate 27b encompassing the periphery of the coil seat 22 will have a larger opening 273, thereby facilitating pulling out the distal end 222 of the coating wire 221, so that the pull out work of the coating wire 221 is convenient to prevent the insulating layer thereof from being scraped. The length of the first side 274 of the pole face 272 of the pole plate 27 may be greater than that of the second side 275, or the thickness or height of the pole face of the first side 274 may be greater than that of the second side 275, so that the pole plate 27 may produce an uneven magnetic force, thereby providing an instantaneously power to the permanent magnet 12 of the rotor 1, so that the rotor 1 is easily started.

Figure 11:
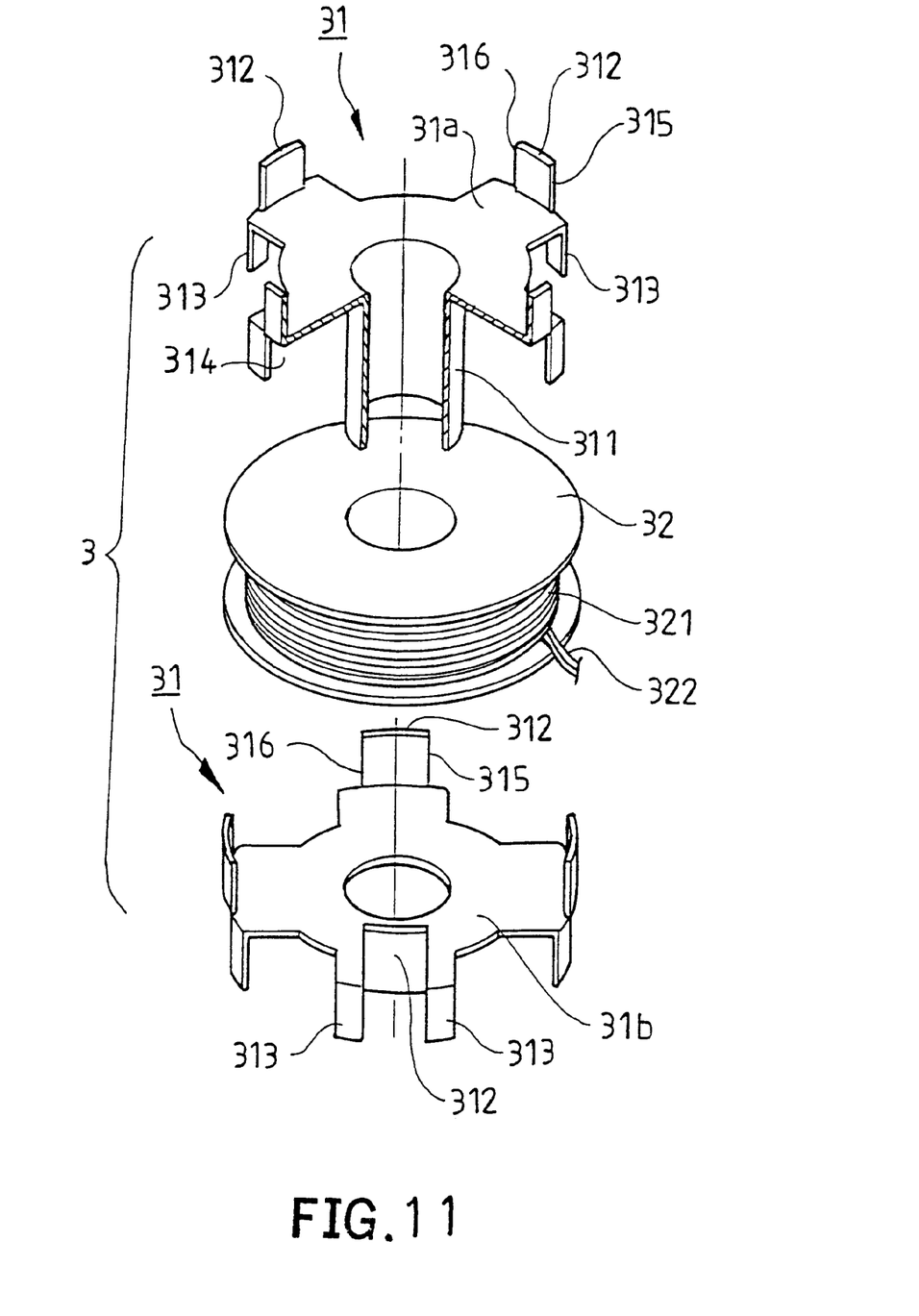
FIG. 11 is an exploded perspective view of a direct current brushless motor of a radial air-gap in accordance with a second embodiment of the present invention.

Referring to FIG. 11, a stator 3 of a second embodiment of the present invention includes two pole plates 31 and a coil seat 32.

Each of the two ends of the coil seat 32 is provided with a pole plate 31. As shown in the figure, the pole plate 31 located above the coil seat 32 is called the upper pole plate 31a, and the pole plate 31 located under the coil seat 32 is called the lower pole plate 31b wherein the upper pole plate 31a has a magnetic conducting tube 311 which is passed through the coil seat 32 and the central hole of the other pole plate 31. The magnetic conducting tube 311 may receive a bearing therein for supporting rotation of the rotation shaft 11 of the rotor 1 (not shown in the figure). The periphery of the pole plate 31 is provided with pole faces including upper pole faces 312 and lower pole faces 313. Thus, the pole plate 31 has larger pole faces to induce with the permanent magnet 12 of the rotor 1. The pole faces of the upper pole plate 31a and the lower pole plate 31b are distributed in an equal angled manner about the center of the pole plate 31. The pole faces of the upper pole plate 31a and the lower pole plate 31b are arranged in an staggered annular manner around the periphery of the coil seat 32. The lower pole faces 313 of the upper pole plate 31a define openings 314 for allowing pull out of the distal end 322 of the coating wire 321 of the coil seat 32.

The coating wire 321 is wound around the coil seat 32, and has a distal end 322 connected to the power supply.

In addition, in the embodiment the opening 314 of the pole plate 31 may be formed by the above-mentioned methods as shown in FIGS. 7–10. Namely, the upper pole plate 24a, 25a, 26a, 27a or the lower pole plate 24b, 25b, 26b, 27b is directly formed with the magnetic conducting tube 21 which is passed through the coil seat 22.

Further, in the embodiment, the length, height or thickness of the first side 315 of the upper pole face 312 or the lower pole face 313 of the pole plate 31 may be greater than that of the second side 316. Thus, the pole plate 31 may produce an uneven magnetic force, thereby providing an instantaneously power to the permanent magnet 12 of the rotor 1, so that the rotor 1 is easily started.

Figure 12:
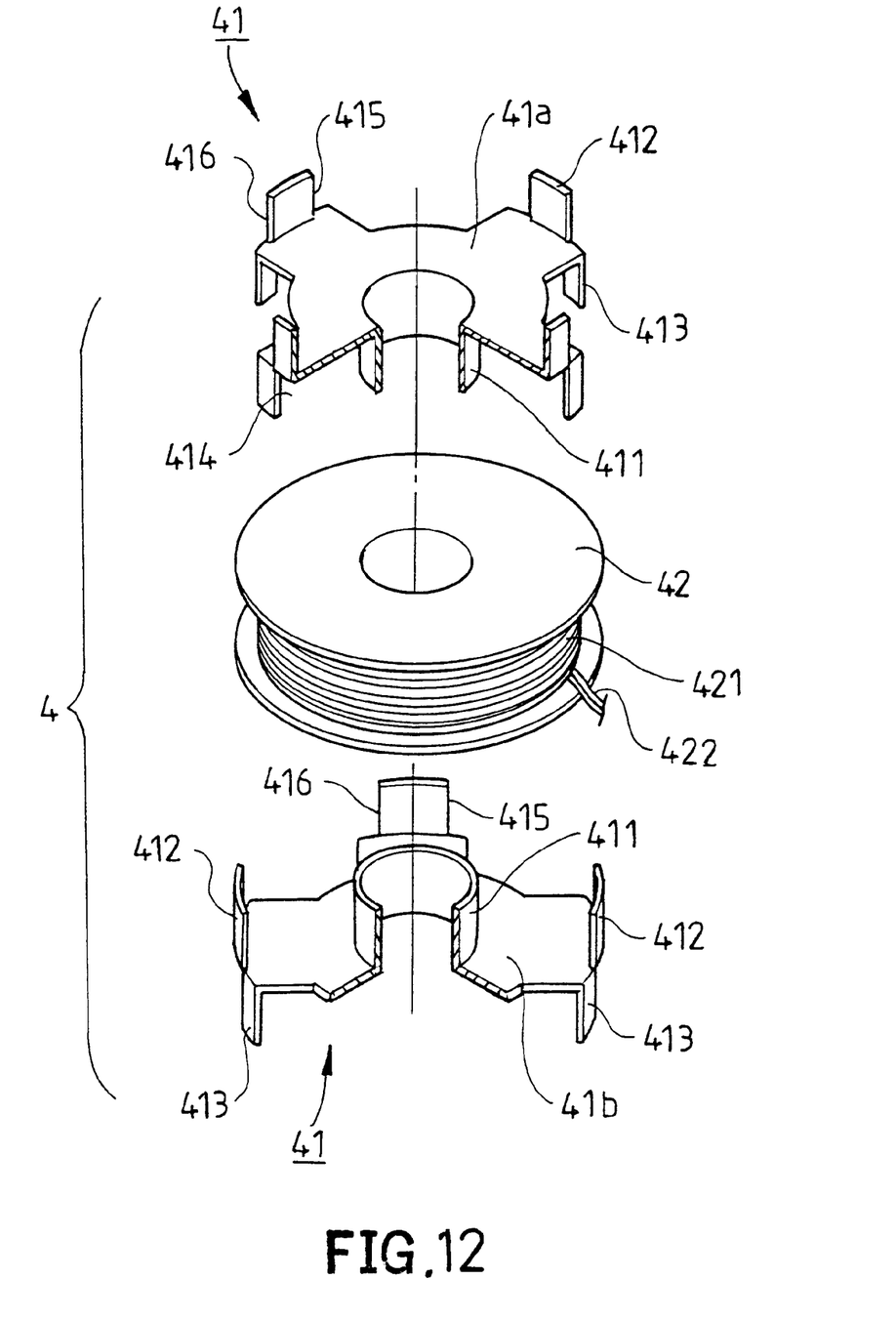
FIG. 12 is an exploded perspective view of a direct current brushless motor of a radial air-gap in accordance with a third embodiment of the present invention.

Referring to FIG. 12, a stator 4 of a third embodiment of the present invention includes two pole plates 41 and a coil seat 42.

Each of the two ends of the coil seat 42 is provided with a pole plate 41. As shown in the figure, the pole plate 41 located above the coil seat 42 is called the upper pole plate 41a, and the pole plate 41 located under the coil seat 42 is called the lower pole plate 41b, wherein each of the two pole plates 41 has a magnetic conducting tube 411. The magnetic conducting tube 411 of each of the two pole plates 41 is passed through the coil seat 42 and is rested with each other. The magnetic conducting tube 411 may receive a bearing therein for supporting rotation of the rotation shaft 11 of the rotor 1 (not shown in the figure). The periphery of the pole plate 41 has pole faces including upper pole faces 412 and lower pole faces 413. Thus, the pole plate 41 has larger pole faces to induce with the permanent magnet 12 of the rotor 1. The pole faces of the upper pole plate 41a and the lower pole plate 41b are distributed in an equal angled manner about the center of the pole plate 41. The pole faces of the upper pole plate 41a and the lower pole plate 41b are arranged in an staggered annular manner around the periphery of the coil seat 42. The lower pole faces 413 of the upper pole plate 41a define openings 414 for allowing pull out of the distal end 422 of the coating wire 421 of the coil seat 42.

The coating wire 421 is wound around the coil seat 42, and has a distal end 422 connected to the power supply.

In addition, in the embodiment, the opening 414 of the pole plate 41 may be formed by the above-mentioned methods as shown in FIGS. 7–10. Namely, the upper pole plate 24a, 25a, 26a, 27a or the lower pole plate 24b, 25b, 26b, 27b is directly formed with the magnetic conducting tube 21 which is passed through the coil seat 22.

Further, in the embodiment, the length, height or thickness of the first side 415 of the upper pole face 412 or the lower pole face 413 of the pole plate 41 may be greater than that of the second side 416. Thus, the pole plate 41 may produce an uneven magnetic force, thereby providing an instantaneously power to the permanent magnet 12 of the rotor 1, so that the rotor 1 is easily started.

Accordingly, the direct current brushless motor of a radial air-gap in accordance with the present invention can be worked easily, can be assembled conveniently, and has pole faces whose sensing area is greater than that of the conventional stator pole plate to induce with the permanent magnet of the rotor, thereby increasing the output torque of the motor. Especially, when the stator is combined with the coil seat, the opening formed between the pole faces is larger than that formed in the conventional pole plate encompassing the coil seat. Thus, the distal end of the coating wire mounted on the coil seat can be drawn outward easily, thereby preventing the coating wire from being scraped to break the insulation effect thereof.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A direct current brushless motor of a radial air-gap, comprising:
   a rotor, having a rotation shaft and an annular permanent magnet;
   a stator, having a magnetic conducting tube for rotation of the rotation shaft of the rotor, the magnetic conducting tube having an outer wall combined with a coil seat, the coil seat having two ends respectively mounted with an upper pole plate and a lower pole plate, each of the upper pole plate and the lower pole plate having a periphery having upper pole faces and lower pole faces respectively extended upward and downward therefrom, the pole faces induced with the permanent magnet of the rotor, the pole faces of the upper pole plate and the lower pole plate having different widths and the plates arranged in a staggered manner, the lower pole faces of the upper pole plate or the upper pole faces of the lower pole plate encompassing the coil seat being formed with openings by difference of the widths of the plates for allowing pull out of a distal end of a coating wire of the coil seat.

2. The direct current brushless motor of a radial air-gap as claimed in claim 1, wherein the magnetic conducting tube of the stator extends through the coil seat and the pole plates at the two ends of the coil seat.

3. The direct current brushless motor of a radial air-gap as claimed in claim 1, wherein the magnetic conducting tube is directly formed on the upper pole plate.

4. The direct current brushless motor of a radial air-gap as claimed in claim 1, wherein the magnetic conducting tube is respectively formed on the two pole plates, the magnetic conducting tubes of the two pole plates extend through the coil seat simultaneously, and are rested with each other.

5. The direct current brushless motor of a radial air-gap as claimed in claim 1, wherein the opening is formed by the upper pole face or the lower pole face of each pole plate.

6. The direct current brushless motor of a radial air-gap as claimed in claim 1, wherein the upper pole faces and the lower pole faces of each pole plate are arranged in a staggered manner, so that the pole faces of the two pole plates encompassing the coil seat form the openings.

7. The direct current brushless motor of a radial air-gap as claimed in claim 1, wherein the upper pole faces and the lower pole faces of the pole plate are respectively mounted on an upper end and a lower end of the pole plate and are arranged in a staggered manner.

8. The direct current brushless motor of a radial air-gap as claimed in claim 1, wherein the pole face of each pole plate has a first side and a second side, the first side has a length greater than that of the second side.

9. The direct current brushless motor of a radial air-gap as claimed in claim 1, wherein the pole face of each pole plate has a first side and a second side, the first side has a thickness greater than that of the second side.

10. The direct current brushless motor of a radial air-gap as claimed in claim 1, wherein the first side of the pole faces has a height greater than that of the second side of the pole faces.

11. The direct current brushless motor of a radial air-gap as claimed in claim 1, wherein the magnetic conducting tube is directly formed on the lower plate.

12. A direct current brushless motor of a radial air-gap, comprising:
   a rotor, having a rotation shaft and an annular permanent magnet;
   a stator, having a magnetic conducting tube for rotation of the rotation shaft of the rotor, the magnetic conducting tube having an outer wall combined with a coil seat, the coil seat having two ends respectively mounted with an upper pole plate and a lower pole plate, each of the upper pole plate and the lower pole plate having a periphery having upper pole faces and lower pole faces respectively extended axially upward and axially downward directions, the pole faces induced with the permanent magnet of the rotor, the pole faces of the upper pole plate and the lower pole plate arranged in a staggered manner, the pole faces of one pole plate encompassing a periphery of the coil seat, the pole faces of the one pole plate being formed with openings therebetween for allowing pull out of a distal end of a coating wire of the coil seat, the pole face of each of the pole plates has a first side and a second side, and the first side has a length greater than that of the second side.

13. The direct current brushless motor of a radial air-gap as claimed in claim 12, wherein the magnetic conducting tube of the stator extends through the coil seat and the pole plates at the two ends of the coil seat.

14. The direct current brushless motor of a radial air-gap as claimed in claim 12, wherein the magnetic conducting tube is directly formed on the upper pole plate.

15. The direct current brushless motor of a radial air-gap as claimed in claim 12, wherein the magnetic conducting tube is respectively formed on the two pole plates, the magnetic conducting tubes of the two pole plates extend through the coil seat simultaneously, and are rested with each other.

16. The direct current brushless motor of a radial air-gap as claimed in claim 12, wherein the openings are formed between the pole faces of each pole plate.

17. The direct current brushless motor of a radial air-gap as claimed in claim 12, wherein the pole face of each pole plate has a first side and a second side, the first side has a thickness greater than that of the second side.

18. The direct current brushless motor of a radial air-gap as claimed in claim 12, wherein the first side of the pole faces has a height greater than that of the second side of the pole faces.

19. The direct current brushless motor of a radial air-gap as claimed in claim 12, wherein the magnetic conducting tube is directly formed on the lower plate.

* * * * *